United States Patent [19]

Carlo

[11] Patent Number: 5,449,957
[45] Date of Patent: Sep. 12, 1995

[54] SELF-CONTAINED ANTI-THEFT DEVICE FOR MOTOR VEHICLES

[75] Inventor: Louis D. Carlo, Litchfield, Ohio

[73] Assignee: Winner International Royalty Corporation

[21] Appl. No.: 96,427

[22] Filed: Jul. 26, 1993

[51] Int. Cl.[6] .................. B60R 25/04; B60R 25/10
[52] U.S. Cl. ..................... 307/10.3; 180/287; 340/426
[58] Field of Search ................. 307/10.2–10.8; 340/426, 825.31, 825.34; 70/DIG. 30, 258, 255, 237; 180/271, 287; 123/198 B, 198 DC

[56] References Cited

U.S. PATENT DOCUMENTS

| | | | |
|---|---|---|---|
| 3,646,515 | 2/1972 | Vodehnal | 307/10.3 |
| 4,110,734 | 8/1978 | Lepore et al. | 307/10.3 |
| 4,452,197 | 6/1984 | Weber | 307/10.3 |
| 4,553,127 | 11/1985 | Issa | 180/287 |
| 4,842,093 | 6/1989 | Lerche et al. | 307/10.3 |
| 4,958,084 | 9/1990 | Carlo et al. | 307/10.2 |
| 5,132,551 | 7/1992 | Carlo et al. | 307/10.3 |
| 5,184,023 | 2/1993 | Carlo et al. | 307/10.3 |
| 5,287,006 | 2/1994 | Carlo et al. | 307/10.3 |

FOREIGN PATENT DOCUMENTS 350325 1/1990 European Pat. Off. .

OTHER PUBLICATIONS

European Search Report, dated Nov. 24, 1994.

Primary Examiner—William M. Shoop, Jr.
Assistant Examiner—Richard T. Elms
Attorney, Agent, or Firm—Vickers, Daniels & Young

[57] ABSTRACT

An anti-theft device mountable on, in or otherwise adjacent the battery of a motor vehicle includes an enclosed power switch for opening the starting circuit between the battery and starter motor when the anti-theft device is activated, whereby it is impossible to start the vehicle. A normally closed bimetal switch device is connected in parallel with the power switch in one embodiment and is connected to the vehicle battery through the ignition switch whereby, when the power switch is open, an effort to start the vehicle through the ignition switch or by shortening the latter results in a noise which simulates a weak battery. A resistance is also connected across the power switch in parallel therewith to preclude the dropout of pre-set electrical accessories in the vehicle when the power switch is open. The anti-theft device is preferably operable by a remotely controlled encoder having a code signal identified by circuitry controlling operation of the power switch.

22 Claims, 4 Drawing Sheets

SELF-CONTAINED ANTI-THEFT DEVICE FOR MOTOR VEHICLES

BACKGROUND OF THE INVENTION

This invention relates to the art of anti-theft devices for motor vehicles and, more particularly, to an improved self-contained anti-theft device which can be provided in, directly attached to or otherwise mounted adjacent the battery of a motor vehicle.

The present invention provides improvements in connection with self-contained anti-theft devices of the character disclosed in U.S. Pat. No. 4,553,127 to Francis Issa and U.S. Pat. No. 5,132,551 to Louis D. Carlo et al, which patents are owned by the assignee of the present invention, and the disclosures of which are hereby incorporated herein by reference.

Each of the foregoing patents discloses a self-contained anti-theft device adapted to be mounted in or on a vehicle battery and which is operable to preclude starting of the vehicle engine when the anti-theft device is activated such as through the use of a remotely controlled encoder. More particularly, the anti-theft device comprises a power switch shiftable between first and second conditions respectively operatively connecting and disconnecting the battery to the starting circuit of the vehicle which includes a starting motor and an ignition switch. In both patents, when the anti-theft device is activated, the power switch is automatically shifted into the second condition in response to flow of a substantial amount of current from the battery indicative of an attempt to start the vehicle through use of the ignition switch or shorting thereof. In connection with such an attempt to start the vehicle, the power switch opens for a given short period of time and then closes, and repeats such opening and closing so long as the ignition switch is actuated or the short thereacross continues. Such opening and closing of the power switch precludes the delivery of sufficient current to the starting motor and provides a clicking sound which simulates the sound of a weak battery in the vehicle. This advantageously deters a would-be thief from further tampering with the vehicle in an effort to steal the same by driving it from its parked location. Through the use of the remotely controlled encoder, the power switch shifting arrangement can be disabled for a predetermined period of time, whereby the power switch will remain closed in response to actuation of the ignition switch to allow starting of the vehicle. Once started, the anti-theft device will remain in the first condition, whereby the power switch will remain closed during operation of the vehicle. In the event of a stall, the shifting arrangement is again disabled for a predetermined time so as to allow the vehicle operator to restart the vehicle without having to again actuate the encoder.

In connection with anti-theft devices operating in the foregoing manner, it has been noted that the opening and closing of the power switch in response to an unauthorized effort to start the vehicle often results in the drop out of certain pre-set electrical accessories in the vehicle, such as digital clocks and radios. In this respect, the brief interruption in the flow of current from the battery to the accessories is sufficient to cause the drop out, whereby the vehicle owner may have to reset the devices upon returning to his vehicle following the efforts of a thief to steal the same by jumping the ignition switch. While the opening and closing of the power switch and the resulting chatter simulating a weak battery serve to deter a would-be thief, having to reset digital equipment in the vehicle is an undesirable inconvenience to the vehicle owner. While the latter is apparently avoided in accordance with one embodiment in the Issa patent wherein the power switch remains open when the anti-theft device is actuated and a current limiter in parallel therewith enables continued operation of electrical accessories in the vehicle, Issa states that the current level across the limiter is high enough for various electrical devices including the vehicle lights and cigarette lighter to function normally. This, the very valuable effect of the noise simulating a weak battery in response to an effort to start the vehicle is lost with this embodiment of Issa, and if a would-be thief turns on the vehicle lights or operates other power operated accessories such as the cigarette lighter, power seats or the like, he immediately becomes aware of the fact that the battery is not the problem. Thus, the would-be thief is not likely to be deterred but, rather, will suspect the existence of an anti-theft device and thus continue to attempt to disconnect or otherwise bypass the latter. This can lead to undesirable damage to the vehicle beyond that which may occur as a result of the would-be thief entering the driving compartment of a locked vehicle and jumping the ignition switch. In this respect, for example, the thief may pry open the hood of the vehicle in an effort to locate and disable or bypass the anti-theft device, and if the thief attempts to disable the device still further damage may be done.

SUMMARY OF THE INVENTION

In accordance with one aspect of the present invention, an improved anti-theft device of the foregoing character is provided by which a sound simulating that of a weak battery is produced in response to actuating the ignition switch or in attempting to bypass the latter when the anti-theft device is in the actuated mode in which the power switch disconnects the vehicle battery from the starting motor. More particularly in accordance with this aspect of the invention, an electrically actuated device capable of making the desired noise, such as a normally closed bimetal switch device for example, is connected in parallel with the power switch whereby, when the power switch is opened, current flows through the bimetal switch in response to actuation of the ignition switch or an attempt to jump the latter. In response to such current flow, the bimetal switch repeatedly opens and closes thus to produce a chattering sound simulating that of a weak battery. When the anti-theft device is deactivated, the power switch closes to enable normal starting of the engine by actuating the ignition switch, whereby current flow from the battery through the power switch to the starting motor bypasses the noise making device.

In accordance with another aspect of the invention, anti-theft devices as described above, including those disclosed in the patents to Carlo et al and Issa, are improved by providing a resistance in parallel with the power switch, or the power switch and noise making device, for the purpose of preventing dropout of digitized electrical accessories such as clock and radio displays and volatile memories while, at the same time, limiting current flow to the accessories such that when the power switch is open accessories such as headlights will function as if the battery were weak. In this respect, for example, the headlights would dim as opposed to being bright when functioning normally. It will be appreciated, therefore, that the resistance is such that the magnitude of the current flow thereacross is insufficient for electrical accessories such as headlights, cigarette lighters, powered seats, windshield wipers, horns and the like to function normally when the power switch is open. Thus, in accordance with one embodiment, activation of the anti-theft device opens the power switch, provides for continued operation of electrical pre-sets such as digital clock and radio displays and volatile memory, precludes starting of the vehicle engine in response to actuation of the ignition switch or an effort to bypass the latter and, in response to the latter actions, produces a noise simulating that of a weak battery and also indicates the latter in response to an effort to operate the headlights and the like, thus to dissuade a would-be thief from continuing an attempted theft. In accordance with another embodiment, activation of the anti-theft device results in the power switch pulsing open and closed in response to actuation of the ignition switch, thus to preclude starting of the vehicle engine and to produce a noise simulating a weak battery while, at the same time, precluding the dropout of electrical pre-sets while the power switch is open.

It is accordingly an outstanding object of the present invention to provide an improved self-contained anti-theft device of the character having a power switch which, when the device is activated, functions to open the circuit between the starting motor and battery, thus to preclude starting the vehicle engine.

Another object is the provision of an improved anti-theft device of the foregoing character wherein the power switch is normally open when the device is activated and a noise simulating that of a weak battery is produced in response to an effort to start the engine when the anti-theft device is activated.

A further object is the provision of an anti-theft device of the foregoing character in which the operation of pre-set electrical devices such as digital displays and volatile memories is maintained when the anti-theft device is activated and the power switch is opened to disconnect the starting motor from the battery of the vehicle.

Still a further object is the provision of an anti-theft device of the foregoing character wherein the current to maintain operation of electrical devices is insufficient for normal operation of other accessories such as lights, whereby an effort to operate such accessories results in an effect simulating a weak battery.

Yet another object is the provision of an anti-theft device of the foregoing character wherein shifting of the power switch between operable and inoperable modes with respect to starting of the vehicle engine is achieved through the use of a remotely operable encoder.

Still another object is the provision of an anti-theft device of the foregoing character wherein an electric device is connected in parallel with the power switch and to the battery through the ignition switch whereby, with the power switch open, current flow to electrical accessories of the vehicle is sufficient to maintain accessories having digital displays, volatile memory and the like but is insufficient for normal operation of other accessories such as lights, whereby the latter operate as if the vehicle battery were weak.

BRIEF DESCRIPTION OF THE DRAWINGS

The foregoing objects, and others, will in part be obvious and in part pointed out more fully hereinafter in conjunction with the written description of preferred embodiments of the present invention illustrated in the accompanying drawings in which.

DETAILED DESCRIPTION OF PREFERRED EMBODIMENTS

Figure 1:
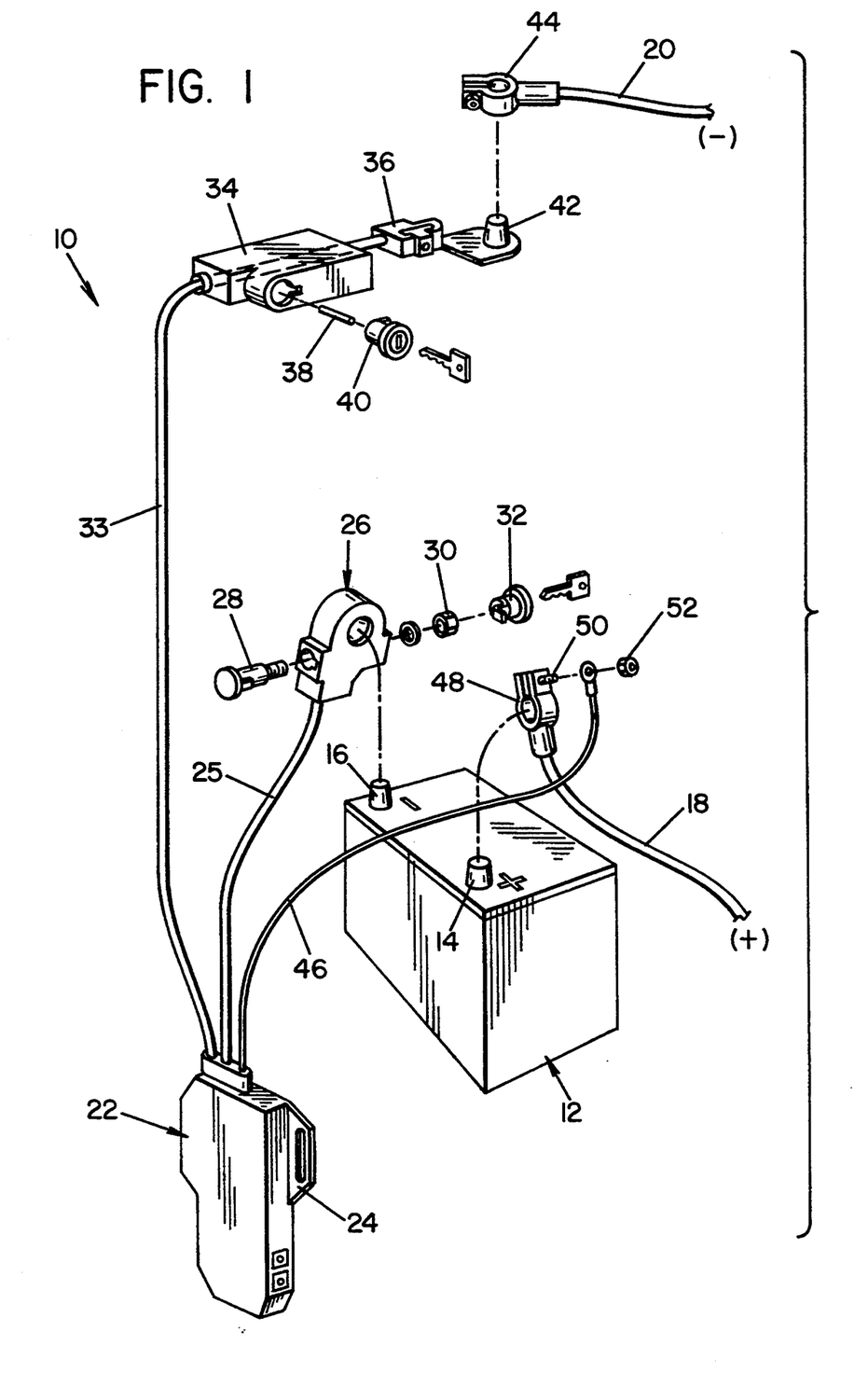
FIG. 1 is an exploded perspective view of a vehicle battery and an anti-theft device in accordance with the present invention.

Referring now in greater detail to the drawings, wherein the showings are for the purpose of illustrating preferred embodiments of the invention, and not for the purpose of limiting the invention, FIG. 1 illustrates the component parts of an anti-theft device 10 connectable to a standard vehicle battery 12 having positive and negative terminals 14 and 16, respectively, for supplying electric current through corresponding positive and negative battery cables 18, and 20. Anti-theft device 10 comprises a housing 22 enclosing circuit components to be described hereinafter and which housing is preferably constructed of suitable plastic material and provided with one or more mounting tabs 24 by which the housing can be secured to the vehicle in the engine compartment such as through the use of threaded fasteners or plastic tying straps, not shown.

The anti-theft device is connected to negative battery terminal 16 by means of a line 25 from housing 22 and terminal clamp 26 which includes a flat headed terminal bolt 28 extending through an opening therefor in clamp 26 to receive a terminal clamp nut 30 which, when threaded onto bolt 28, is disposed within clamp 26. The opening through which nut 30 is accessible for mounting and dismounting clamp 26 on terminal 16 is closed by a key operated plug 32, thus to preclude unauthorized disassembly of the clamp from the battery terminal. The anti-theft device is connected to the negative battery cable 20 through a line 33 from housing 22 and a slide lock box 34 to which a box terminal 36 is secured by means of a lock pin 38 and a key operated locking plug 40. Lock box terminal 36 includes a terminal post 42 adapted to receive clamp 44 on the end of cable 20.

The anti-theft device is connected to the positive terminal of battery 12 by lead 46 from housing 22 which is attached to clamp 48 on the end of battery cable 18 such as by clamp bolt 50 and clamp nut 52. As will be appreciated from the description thus far, the anti-theft device can not be detached from battery 12 by an unauthorized person in that terminal block 26 requires the use of a key to access the clamp, bolt and nut assembly. If a would-be thief attempts to remove terminal block 26 from the battery, battery terminal 16 will be destroyed, thus making it impossible to attach negative battery cable 20 to the terminal. Accordingly, a thief can not disconnect negative battery cable 20 from terminal 42 and reconnect it to battery terminal 16 so as to bypass the anti-theft device.

Figure 2:
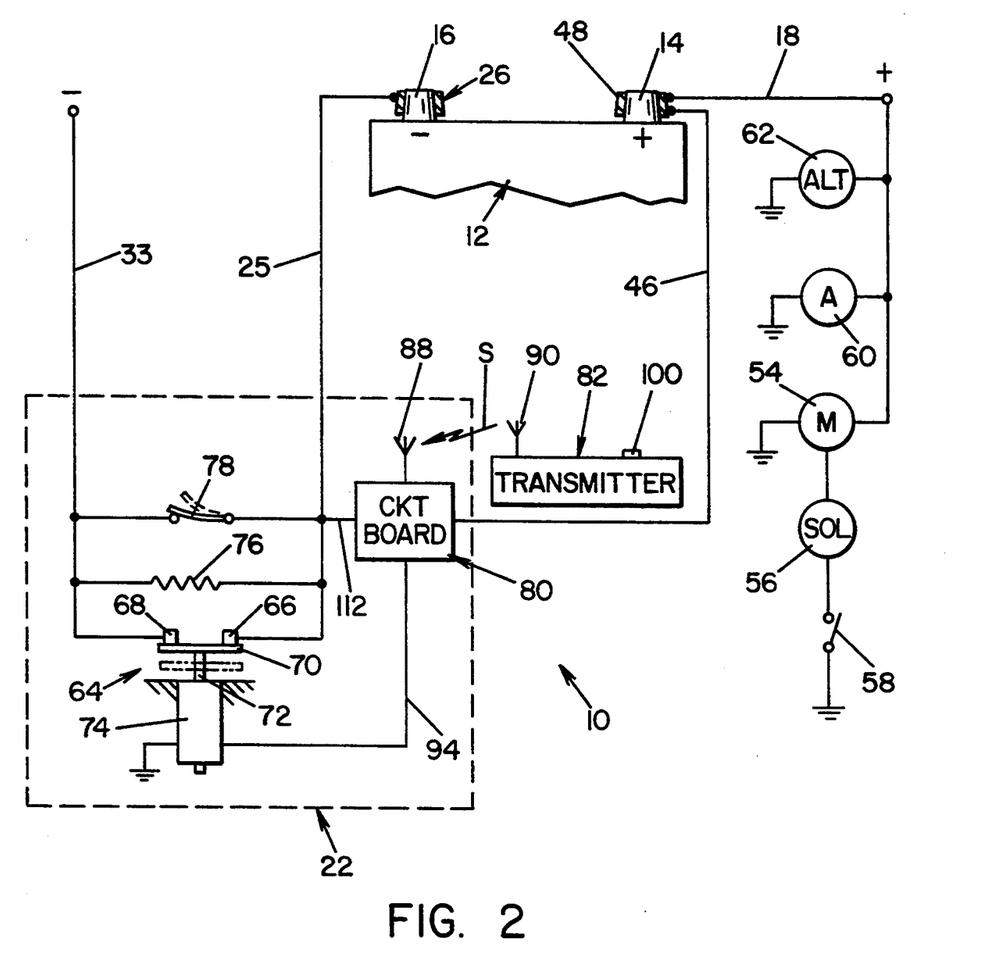
FIG. 2 is a schematic illustration of an operating circuit for the anti-theft device.

Referring now to FIG. 2, it will be appreciated that a vehicle in which anti-theft device 10 is mounted has electrical circuitry including a standard starting circuit comprising a starting motor 54, solenoid 56 and an operating or ignition switch 58. As is well known, when the ignition switch is closed, solenoid 56 engages starting motor 54 with the engine flywheel and causes current flow from battery 12 through the starting motor to start the vehicle. As is further well known, battery 12 drives various electrical components schematically illustrated in FIG. 2 as accessories 60 which include, for example, the vehicle lights, ignition system, radios, clocks, fans, power equipment, cigarette lighters and the like, some of which accessories such as radios and clocks include pre-set digital displays and volatile memory which must be continuously energized so as to avoid having to reset the devices. As is still further well known, the electrical system in the vehicle includes an alternator 62 for applying current to battery 12 during operation of the vehicle for purposes of charging the battery.

Anti-theft device 10 is adapted to preclude the unauthorized starting of the vehicle in response to closure of ignition switch 58 and, for this purpose, is provided with a remotely controllable power switch 64 in housing 22 which, when open, interrupts current flow from battery 12 to the starting circuit. More particularly, power switch 64 includes contacts 66 and 68, respectively on lines 25 and 33 of the anti-theft device, and a jumper bar 70 attached to plunger 72 of a solenoid 74 by which the jumper bar is displaceable between closed and opened positions relative to contacts 66 and 68. In the closed, solid line position, of jumper bar 70 shown in FIG. 2 the starting circuit is connected across battery 12, and in the open, broken line position of the jumper bar the starting circuit is disconnected from the battery. For the purpose set forth hereinafter, a resistor 76 and a normally closed bimetal switch device 78 are each connected across lines 25 and 33 in parallel with power switch 64.

Figure 3:
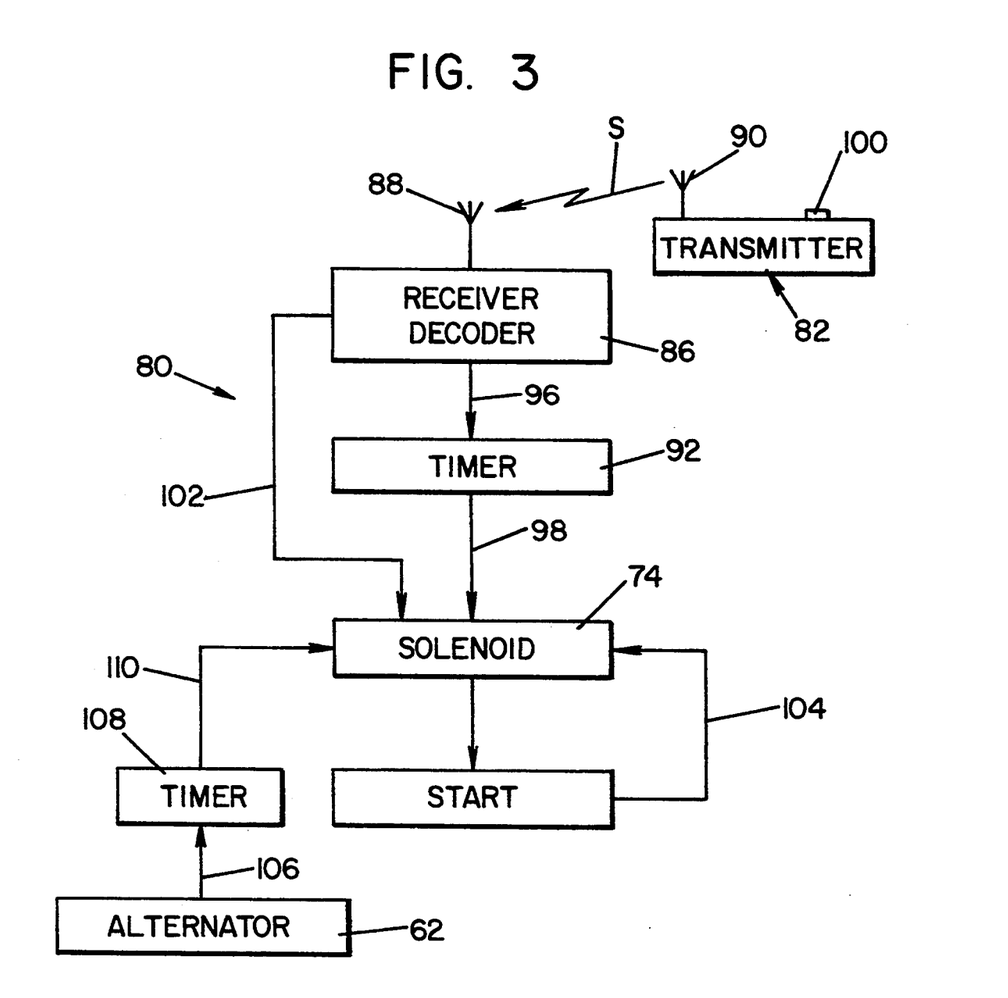
FIG. 3 is a flow diagram of the operation of the anti-theft device.

As will be appreciated from FIGS. 2 and 3 of the drawing, anti-theft device 10 includes a control circuit 80 enclosed within housing 22, and a transmitter 82 for remotely activating control circuit 80 in a manner to achieve opening and closing of power switch 64. Control circuit 80 includes a receiver-decoder 86 including an antenna 88 for receiving signals S from antenna 90 of transmitter 82. Control circuit 80 further includes a reset timer 92 which is part of a micro-processor, not shown, used in the control circuit. In accordance with the preferred embodiment, transmitter 82 provides for passive control of power switch 64 through control circuit 80 and, in this respect, is a personal identification unit carried by the vehicle owner and which continuously transmits a series of electromagnetic coded signals S at short intervals, such as about ten seconds. The coded signals are an arrangement of pulses unique to the particular transmitter, whereby the latter identifies an authorized operator of the vehicle. Receiver-decoder 86 of control circuit 80 has a decoding network for recognizing the unique coded pattern of signals S from transmitter 82, and the periodic transmission of signals S provides for control circuit 80 to be activated in accordance with the location of transmitter 82 relative to the vehicle. In this respect, for example, if the operator of the vehicle is within fifty feet thereof, control circuit 80 will be activated by signals S whereas, if the operator is beyond fifty feet, transmitter 82 is outside the range of transmission of signals S for the purpose of activating control circuit 80. It will be appreciated of course that the range of transmission for transmitter 82 can vary in accordance with the strength of a battery therein, not shown, by which the transmitter is powered.

When the operator of the vehicle is within the vicinity thereof, control circuit 80 is activated to connect solenoid 74 to battery 12 through line 94 to close power switch 64. At this time, the component parts of the system are in the solid line positions thereof shown in FIG. 2 of the drawings. Moreover, control circuit 80 maintains power switch 64 in the closed position so long as the operator remains within the vicinity of the vehicle. In this respect, signals S are transmitted to receiver-decoder 86 periodically, such as every ten seconds, and the decoder, upon recognizing and acknowledging the unique coded signal from the transmitter, transmits a signal through output 96 to reset timer 92 which has an expiration time greater than the ten second period between signals S and which expiration time is, for example, thirty seconds. Each time reset timer 92 receives a signal from output 96, it resets to the full expiration time thereof. Therefore, if the operator remains in the vicinity of the vehicle, timer 92 continues to reset in response to signals S and the component parts remain in the positions thereof shown in FIG. 2. When the vehicle operator leaves the vicinity of the vehicle, signals S are no longer received by receiver-decoder 86 and, accordingly, the thirty second expiration time of timer 92 expires without the timer receiving a reset signal through output 96. Consequently, timer 92 outputs a signal through line 98 by which solenoid input line 94 is disconnected from battery 12. Solenoid 74 is therefore de-energized, whereby power switch 64 moves to the open, broken line position thereof shown in FIG. 2 to disconnect battery 12 from the vehicle starting circuit. When the vehicle owner subsequently moves back into the vicinity of the vehicle, the first signal S received by receiver-decoder 86 is outputted through timer 92 via line 98 to again connect solenoid input line 94 with battery 12, whereupon the solenoid is energized to close power switch 64 enabling starting of the vehicle. Subsequent signals S received by receiver-decoder 86 and outputted through line 96 to timer 92 operate as described hereinabove to reset the timer, whereby power switch 64 remains closed until such time as the operator again leaves the vicinity of the vehicle.

Preferably, transmitter 82 is provided with a selectively operable pushbutton override 100 to provide for manually or actively controlling operation of power switch 64 through control circuit 80. In this respect, manual depression of pushbutton 100 by the vehicle owner provides for continuous transmission of signals S to receiver-decoder 86 as opposed to the periodic signal transmitted when the transmitter is operated in the passive mode as described hereinabove. A continuous signal S from the transmitter, after decoding and acceptance by receiver-decoder 86, is outputted by the micro-processor through line 102, bypassing timer 92, whereby solenoid 74 is directly activated or deactivated. Transmitter 82 can be provided with a switch, for example, for shifting the transmitter between the active and passive modes of operation thereof and, when in the active mode, sequential signals S resulting from sequential depressions of pushbutton 100 are operable through control circuit 80 to sequentially shift the solenoid between the two modes thereof and, thus, power switch 64 between the open and closed positions thereof. It will be appreciated, of course, that transmitter 82 has to be within the transmitting range thereof in the active mode in order for the signals to be received by receiver-decoder 86. It will be appreciated from the foregoing description that when the vehicle operator is within the transmitting range of transmitter 82 and the component parts of the control circuit are in the solid line positions thereof shown in FIG. 2, depression of pushbutton 100 causes power switch 64 to open and move to the broken line position thereof and that the subsequent depression of pushbutton 100 shifts the power switch back to its closed position.

With further regard to FIGS. 2 and 3 of the drawing, when power switch 64 is closed the vehicle can be started by closing ignition switch 58 in that power switch 64 connects battery 12 with the starting circuit so as to provide for the delivery of sufficient current to the starting circuit to operate starting motor 54. When the engine is started and running, the control circuit is operable as indicated by line 104 to maintain solenoid 74 energized and thus power switch 64 closed. Should the engine stall, it will be appreciated that power switch 64 will remain closed as the result of the proximity of transmitter 82 if the latter is operating in the passive mode, or as a result of the closed disposition of the switch resulting from the previous depression of pushbutton 100 of the transmitter. Thus, the vehicle can be restarted when stalled without any action on the part of the operator other than to restart the engine in the normal manner through use of the ignition key. However, if the engine stops and the operator leaves the vehicle, provision is made to assure opening of power switch 64 in the event transmitter 82 either fails in the passive mode, or the operator forgets to depress pushbutton 100 in the active mode. In this respect, when the engine stops, the output of alternator 62 also stops, and the control circuit outputs a signal as indicated by the line 106 indicative of this condition and which operates through a one-shot timer 108 to output a signal through line 110 to the control circuit for the purpose of disconnecting solenoid 74 from battery 12 and thus opening power switch 64 if the engine is not restarted within a predetermined period of time such as two minutes determined by timer 108. Thus, if power switch 64 is not opened automatically in response to the movement of transmitter 82 beyond the transmission range thereof, or by depression of pushbutton 100 in the active mode of the transmitter, the switch will be opened through timer 108 so that the vehicle owner does not leave the vehicle with the anti-theft device unactivated.

When the vehicle owner leaves the vehicle and activates anti-theft device 10, thus opening power switch 64, it will be appreciated that the vehicle accessories are connected to battery 12 through resistance 76 which is in parallel with switch 64. This is important in connection with the accessories that must continuously operate, such as clocks, and is extremely important in connection with accessories such as clocks and radios having pre-set digital displays and volatile memories which can be lost as the result of interrupting current flow thereto such as would happen with power switch 64 open in the absence of resistance 76. To serve the intended purpose in accordance with the present invention, resistance 76 provides a current flow sufficient to maintain the desired pre-sets but which, preferably, is such that accessories such as the vehicle lights will not operate normally at the current level thereacross. Thus, in response to turning the lights on with switch 64 open, the lights will be dimmer than normal and will lead a would-be thief to believe that the battery is weak. Importantly too in accordance with this embodiment of the invention, normally closed bimetal switch device 78 which is connected in parallel with power switch 64, is operable when power switch 64 is open to provide a noise simulating that of a weak battery upon closure of ignition switch 58 or an effort to bypass the latter. In this respect, control circuit 80 responds to closure of the ignition switch or an effort to bypass the same by passing current from battery B through lead 112 across the normally closed bimetal switch 78. In a well known manner, the latter is heated by such current flow and thus deflected from the closed to the opened, broken line position shown in FIG. 2 and, upon cooling, returns to the closed position whereupon the current flow thereacross causes the switch to open again. Accordingly, it will be appreciated that the device operates in the manner of a vehicle turn signal flasher control and that both the timing of the repetitiveness of opening and closing as well as the level and tone of the sound produced thereby can be designed for simulating the chatter which is heard when an effort is made to start a vehicle having a weak battery. Thus, a would-be thief not only can not start the vehicle but also is led to believe that the vehicle battery is weak, whereby the attempted theft will normally be abandoned.

Figure 4:
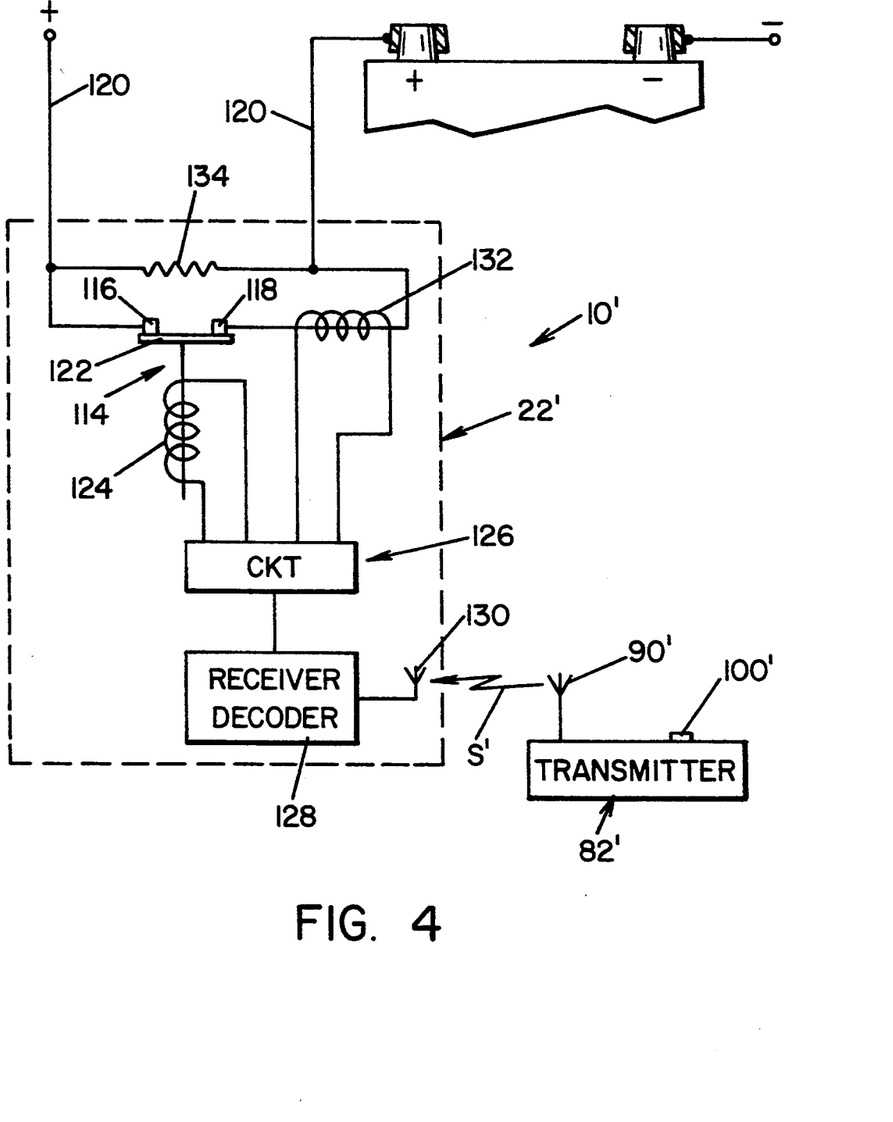
FIG. 4 is a schematic illustration of another operating circuit for the anti-theft device.

FIG. 4 illustrates an embodiment of the anti-theft device equivalent to those disclosed in the aforementioned patent to Carlo et al and in particular to the embodiment of FIG. 6 in the latter patent. In this respect, anti-theft device 10′ includes a power switch 114 comprising terminals 116 and 118 interposed in battery cable 120, and a jumper bar 122 which is reciprocated by a relay coil 124 under the control of a control circuit 126. The control circuit includes a receiver-decoder 128 having an antenna 130 which receives the coded command signals S′ from remote transmitter 82′ which is operated in the active mode in this embodiment. As described in the Carlo et al patent, power switch 114 is normally closed and, when the anti-theft device is activated, opens and closes in response to an effort to start the engine, thus producing a chattering noise simulating that of a weak battery. The opening of power switch 114 is in response to high current flow through battery cable 120, and the current in battery cable 120 is measured by a surrounding inductor coil 132 having leads connected to control circuit 126. When switch 114 opens, control circuit 126 senses no current flow and this allows switch 114 to close after a predetermined time and then to reopen when circuit 126 again receives an input signal from coil 132. Thus, an unauthorized person cannot start the vehicle engine.

As will be further appreciated from the Carlo et al patent, control circuit 126 includes a lockout or override circuit adapted to be operated by transmitter 82′ so as to preclude opening of power switch 114 in response to high current flow through battery cable 120, whereby the vehicle owner can start the vehicle. More particularly, transmitter 82′ transmits signal S′ to antenna 130 of receiver-decoder 128 of control circuit 126 which then operates to maintain power switch 114 closed for a predetermined period of time during which the vehicle owner must enter the vehicle and start the engine. If this time is exceeded, the override circuit is deactivated and the vehicle owner must again depress transmitter button 100′ to again activate the override for another time period. Once the vehicle is started, control circuit 126 functions to maintain power switch 114 closed. Should the engine stall, control circuit 126 operates to provide a period of time during which the vehicle owner can restart the engine without power switch 114 opening and closing in response to such a starting effort. For example, as described hereinabove in conjunction with the embodiment of FIGS. 1–3, the vehicle alternator can be employed to detect the stall condition and to initiate timing of a period, such as two minutes, for restarting the engine.

In accordance with one aspect of the present invention, anti-theft device 10' is provided with a resistance 134 across battery cable 120 in parallel with power switch 114. Accordingly, when power switch 114 opens and closes in response to an effort to start the vehicle engine when the anti-theft device is activated, resistance 134 maintains electrical accessories of the vehicle connected to the battery. Thus, if a would-be thief attempts to start the vehicle by closing the ignition switch or jumping the latter, the thief is deterred by the chattering noise of power switch 114 which leads the thief to believe that the battery is weak. At the same time, resistance 134 assures that the pre-sets will not dropout during such a starting effort.

While considerable emphasis has been placed herein on the preferred embodiment illustrated and described hereinabove, it will be appreciated that other embodiments of the invention can be made and that changes can be made in the preferred embodiment without departing from the principals of the present invention. Accordingly, it is to be distinctly understood that the foregoing descriptive matter is to be interpreted merely as illustrative of the invention and not as a limitation.

Having thus defined the invention, the following is claimed:

1. An anti-theft device for use on a motor vehicle having a starting circuit including an operating switch and a starting motor adapted to draw a substantial amount of current from a battery of said vehicle when said operating switch is actuated, said anti-theft device comprising a power switching device having a first condition connecting said battery to said starting circuit and a second condition disconnecting said starting circuit from said battery, operating means for selectively shifting said power switching device between said first condition and said second condition, and means for producing a noise simulating a weak battery when said power switching device is in said second condition and when said operating switch is actuated.

2. An anti-theft device according to claim 1, wherein said means for producing a noise includes electrically operated means connected in parallel with said power switching device.

3. An anti-theft device according to claim 1, wherein said means for producing a noise includes normally closed thermally actuated switch means.

4. An anti-theft device according to claim 1, wherein said operating means is responsive to an external command signal.

5. An anti-theft device according to claim 4, wherein said command signal is an electric signal transmitted from a location remote from said anti-theft device.

6. An anti-theft device according to claim 1, wherein said vehicle has electrically operated accessories connected to said battery, and said anti-theft device includes means for connecting said accessories to said battery when said power switching device is in said second condition.

7. A anti-theft device according to claim 6, wherein said means for connecting accessories to said battery includes resistance means in parallel with said power switching device.

8. An anti-theft device according to claim 7, wherein said means for producing a noise includes electrically operated means in parallel with said power switching device and with said resistance means.

9. An anti-theft device according to claim 8, wherein said electrically operated means includes a normally closed thermally actuated switch.

10. An anti-theft device according to claim 9, wherein said operating means is responsive to an electric coded signal transmitted from a location remote from said anti-theft device.

11. An access control system for a vehicle having an electrical system including a battery, a starting switch and a starter motor, said anti-theft device comprising housing means adapted to be mounted adjacent said battery and at least one terminal clamp adapted to be attached to a terminal of said battery, an electrically operated power switch in said housing having a closed position connecting said battery to said starter motor through said starting switch and an open position disconnecting said battery from said starter motor, means including remotely operable encoder means for shifting said power switch between said open and closed positions, and electrically operable means connected in parallel with said power switch for producing a clicking noise simulating a weak battery when said power switch is open and said starting switch is actuated.

12. An anti-theft de vice according to claim 11, wherein said electrically operable means includes normally closed bimetal switch means.

13. An anti-theft device according to claim 11, wherein said electrical system includes electrical accessories connected to said battery through said power switch, and a resistance in parallel with said power switch for connecting said accessories to said battery when said power switch is open while precluding sufficient current for operating said starter motor in response to actuation of said starting switch.

14. An anti-theft device according to claim 13, wherein said electrically operable means includes normally closed bimetal switch means.

15. An anti-theft device according to claim 14, wherein said terminal clamp includes threaded fastener means for releasably securing said clamp to said battery terminal and means including key operated cover means precluding unauthorized access to said fastener means.

16. An anti-theft device according to claim 11, wherein said terminal clamp includes threaded fastener means for releasably securing said clamp to said battery terminal and means including key operated cover means precluding unauthorized access to said fastener means.

17. An anti-theft device for use on a motor vehicle having a starting circuit including an operating switch and a starting motor adapted to draw a substantial amount of current from a battery of said vehicle when said operating switch is actuated, and said vehicle having electrical accessories adapted to draw less than said substantial amount of current and including at least one low current drawing pre-set electrical device and at least one high current drawing electrical device, said anti-theft device comprising a power switching device having a first condition connecting said battery to said starting circuit and a second condition disconnecting said starting circuit from said battery, means for shifting said power switching device between said first and second conditions, and means connecting said electrical accessories to said battery when said power switching device is in said second condition for limiting current to said accessories to a value between the draw of said low current drawing pre-set electrical device and said high current drawing electrical device.

18. An anti-theft device according to claim 17, and means for producing a noise simulating a weak battery when said power switching device is in said second condition and said operating switch is actuated.

19. An anti-theft device according to claim 18, wherein said means for producing a noise includes electrically operated means connected in parallel with said power switching device.

20. An anti-theft device according to claim 17, wherein said means connecting said accessories to said battery includes resistance means in parallel with said power switching device.

21. An anti-theft device for use on a motor vehicle having a starting circuit including an operating switch and a starting motor adapted to draw a substantial amount of current from a battery of said vehicle when said operating switch is actuated, and said vehicle having electrical accessories adapted to draw less than said substantial amount of current and including at least one low current pre-set electrical device, said anti-theft device comprising a power switching device having a first condition connecting said battery to said starting circuit and a second condition disconnecting said starting circuit from said battery, current detecting means for detecting said substantial amount of current, operating means for shifting said power switching device between said first and second conditions when said detecting means detects said substantial amount of current, means connecting said electrical accessories to said battery when said power switching device is in said second condition for maintaining said low current pre-set device and means for producing a noise simulating a weak battery when said power switching device is in said second condition and said operating switch is actuated.

22. An anti-theft device according to claim 21, wherein said means connecting said accessories to said battery includes resistance means in parallel with said power switching device.

* * * * *